(12) United States Patent
Kobayashi

(10) Patent No.: US 12,449,594 B2
(45) Date of Patent: Oct. 21, 2025

(54) OPTICAL WAVEGUIDE MODULE AND MANUFACTURING METHOD OF OPTICAL WAVEGUIDE MODULE

(71) Applicant: NEC Corporation, Tokyo (JP)

(72) Inventor: Naoki Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 374 days.

(21) Appl. No.: 18/097,788

(22) Filed: Jan. 17, 2023

(65) Prior Publication Data

US 2023/0314705 A1 Oct. 5, 2023

(30) Foreign Application Priority Data

Mar. 29, 2022 (JP) .................................. 2022-052892

(51) Int. Cl.
*G02B 6/12* (2006.01)
*G02B 6/13* (2006.01)
*G02B 6/293* (2006.01)

(52) U.S. Cl.
CPC ..... *G02B 6/12007* (2013.01); *G02B 6/12004* (2013.01); *G02B 6/13* (2013.01); *G02B 2006/12061* (2013.01); *G02B 2006/12142* (2013.01); *G02B 6/29338* (2013.01); *G02B 6/29395* (2013.01)

(58) Field of Classification Search
CPC .. G02B 6/12007; G02B 6/12004; G02B 6/13; G02B 6/29338; G02B 6/29395; G02B 2006/12061; G02B 2006/12142; H01S 5/0265; H01S 5/142; H01S 5/0687; G02F 1/0147
See application file for complete search history.

(56) References Cited

U.S. PATENT DOCUMENTS 8,145,017 B2 * 3/2012 Tanaka ................. G02B 6/4286
385/32

FOREIGN PATENT DOCUMENTS

| JP | 2017-216384 A | 12/2017 |
| JP | 2017-219668 A | 12/2017 |
| JP | 2018-117161 A | 7/2018 |
| JP | 2019-161065 A | 9/2019 |

* cited by examiner

*Primary Examiner* — John Bedtelyon

(57) ABSTRACT

In order to achieve an optical transmitter that is reduced in size and price, an optical waveguide module includes a wavelength controller that controls a wavelength of output light output from a light source, and a wavelength locker that receives an input of the output light and outputs an electric signal indicating a relation between a wavelength of the output light and a target wavelength, wherein the wavelength controller and the wavelength locker are formed as a semiconductor optical waveguide on the same semiconductor substrate.

16 Claims, 8 Drawing Sheets

OPTICAL WAVEGUIDE MODULE AND MANUFACTURING METHOD OF OPTICAL WAVEGUIDE MODULE

This application is based upon and claims the benefit of priority from Japanese Patent Application No. 2022-052892, filed on Mar. 29, 2022, the disclosure of which is incorporated herein in its entirety by reference.

TECHNICAL FIELD

The present invention relates to an optical waveguide module and the like.

BACKGROUND ART

In an optical transmitter to be used in an optical wavelength multiplex transmission system, a tunable laser is generally used in order that a wavelength associated with a specification of the system is set for a light source of an optical signal. The tunable laser includes the light source that generates laser light and a tunable unit that controls a wavelength of the light source.

A wavelength locker has been known as a technique for setting a wavelength of a tunable laser in an accurate manner. Light being output from the tunable laser is input to the wavelength locker. The wavelength locker outputs a signal indicating a relation between a wavelength of the input light and a desired wavelength. The desired wavelength is a wavelength specified in a system. Further, a wavelength of a tunable light source is controlled in such a way that a signal being output from the wavelength locker indicates that the tunable laser emits light having the desired wavelength. Under such control, a wavelength of an optical signal can be set in an accurate manner. In relation to the present invention, Patent Literatures (PTLs) 1 to 4 describe a technique relating to the tunable light source.

[PTL 1] Japanese Unexamined Patent Application Publication No. 2018-117161
[PTL 2] Japanese Unexamined Patent Application Publication No. 2019-161065
[PTL 3] Japanese Unexamined Patent Application Publication No. 2017-216384
[PTL 4] Japanese Unexamined Patent Application Publication No. 2017-219668

SUMMARY

In a general optical transmitter equipped with a wavelength locker, the wavelength locker and a tunable unit are each provided as a discrete optical component. Then, to monitor wavelength of output light from the tunable laser by the wavelength locker, an optical circuit that inputs a light output from the tunable laser is further necessary by using an optical component such as a beam splitter.

However, the general optical transmitter, which the wavelength locker and the tunable unit are separately arranged, requires longer time for optical axis adjustment of optical coupling between the wavelength locker and the tunable unit as the number of optical components increases. As the result, the general optical transmitter having a wavelength locker has a problem of difficulty in cost-reducing. Moreover, because the general optical transmitter having a wavelength locker requires separately mounting many optical components during assembling, reducing area for mounting the components is difficult.

An exemplary object of the invention is to provide a technique for achieving an optical transmitter that is reduced in size and price with an optical waveguide module.

An optical waveguide module according to an example aspect of the invention includes a wavelength controller that controls a wavelength of output light being output from a light source and a wavelength locker that receives the output light and outputs an electric signal indicating a relation between a wavelength of the output light and a target wavelength, wherein the wavelength controller and the wavelength locker are formed as a semiconductor optical waveguide on the same semiconductor substrate.

A manufacturing method of an optical waveguide module according to an example aspect of the invention includes a procedure of forming, on a semiconductor substrate, a wavelength controller that controls a wavelength of output light being output from a light source, and a procedure of forming, on the semiconductor substrate, a wavelength locker that outputs an electric signal indicating a relation between a wavelength of the output light and a target wavelength.

BRIEF DESCRIPTION OF THE DRAWINGS

Exemplary features and advantages of the present invention will become apparent from the following detailed description when taken with the accompanying drawings in which.

EXAMPLE EMBODIMENT

Example embodiments of the present invention are described below. Aforementioned elements in the example embodiments and the drawings are referred to as the same names and denoted with the same reference symbols, and overlapping description therefor is omitted in each of the example embodiments.

First Example Embodiment

Figure 1:
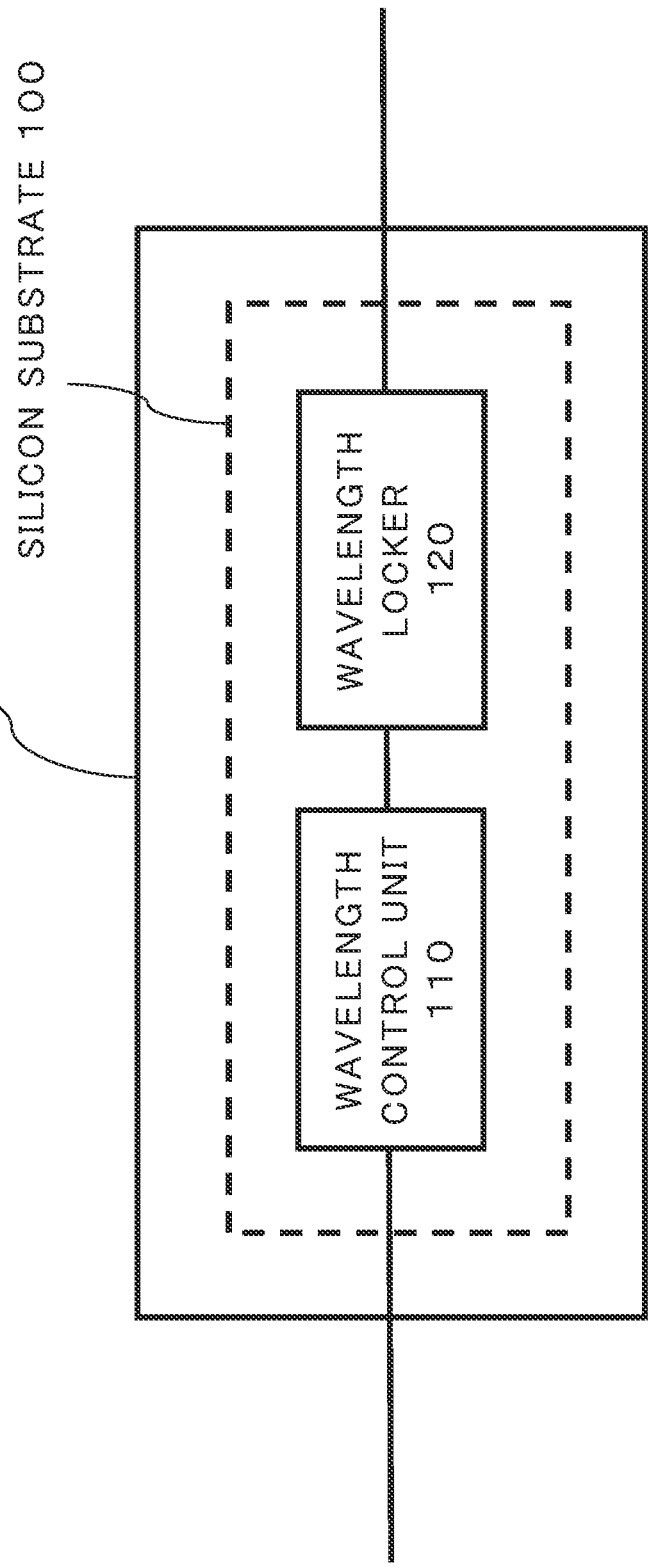
FIG. 1 illustrates a configuration example of an optical waveguide module according to a first example embodiment.

FIG. 1 is a block diagram illustrating a configuration example of an optical waveguide module 10 according to a first example embodiment. The optical waveguide module 10 includes a wavelength control unit 110 and a wavelength locker 120. Light (output light) output from a light source is input to the wavelength control unit 110. However, the light source is not illustrated in FIG. 1. The wavelength control unit 110 includes a function of controlling a wavelength of the light source. For example, the wavelength control unit 110 may constitute a resonator with respect to the light source in such a way as to control a wavelength of the output light. The wavelength control unit 110 is an aspect of a wavelength controller.

The wavelength locker 120 is formed of a silicon optical waveguide. A configuration of the wavelength locker 120 is described with reference to FIG. 2. The output light having a wavelength controlled by the wavelength control unit 110 is input to the wavelength locker 120. Further, the wavelength locker 120 generates and outputs a signal indicating a relation between the wavelength of the output light and a target wavelength. Here, the target wavelength is a wavelength required with respect to the light output from the optical waveguide module 10.

The wavelength control unit 110 and the wavelength locker 120 are formed as silicon optical waveguides on the same silicon substrate 100. Further, an optical transmission path between the wavelength control unit 110 and the wavelength locker 120 is also formed as a silicon optical waveguide. Note that the material of the substrate and the optical waveguide are not limited to silicon.

The optical waveguide module 10 thus configured enables realization of the optical transmitter that is reduced in size and price. The reason therefor is that, since the wavelength control unit 110 and the wavelength locker 120 are formed on the same silicon substrate, manufacturing is facilitated and optical axis adjustment therebetween is not required as compared to a configuration in which those elements are implemented as individual optical elements.

Figure 2:
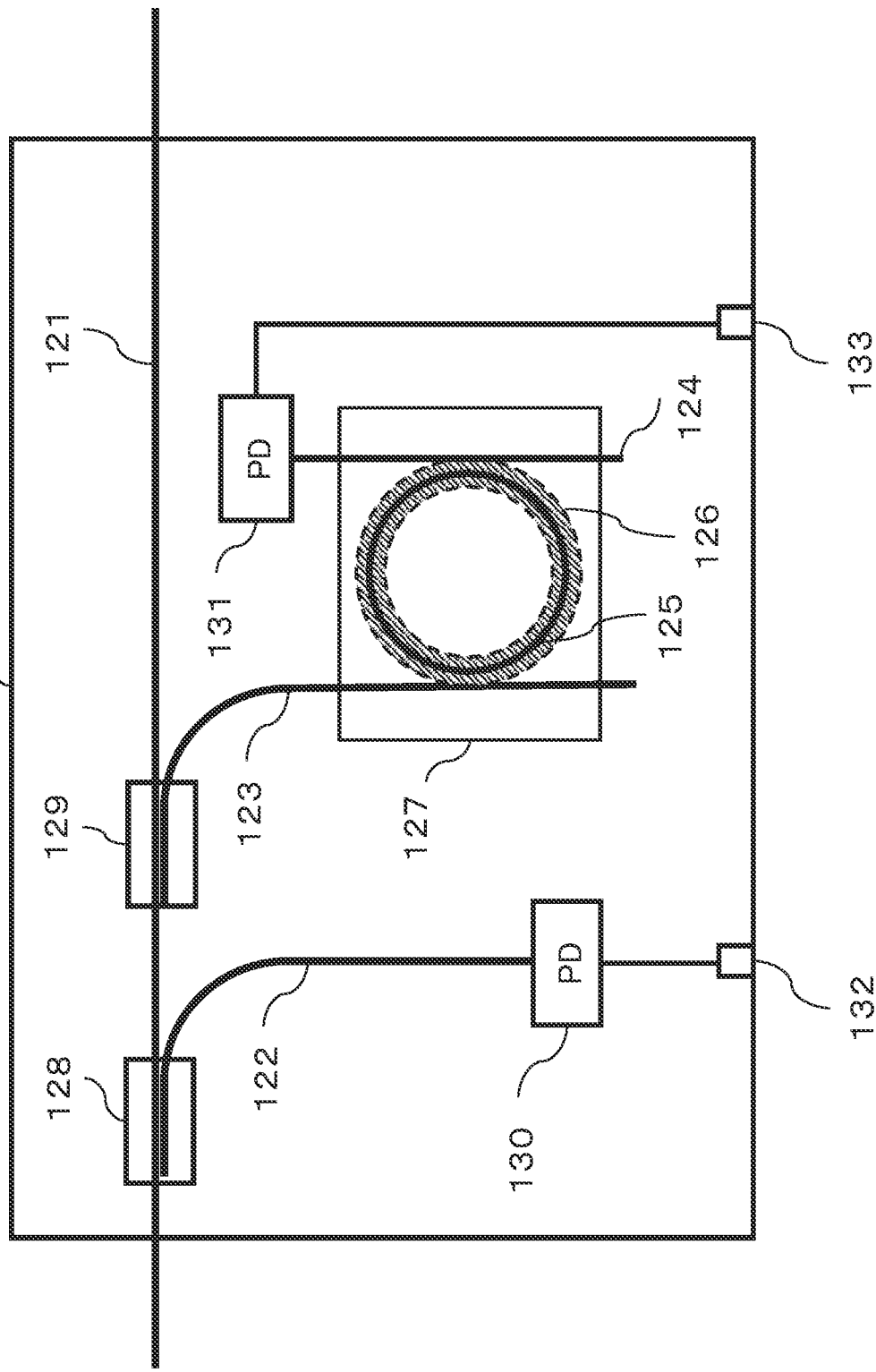
FIG. 2 illustrates a configuration example of a wavelength locker in the first example embodiment.

FIG. 2 is a block diagram illustrating a configuration example of the wavelength locker 120. The wavelength locker 120 includes optical waveguides 121 to 124, a ring optical waveguide 125, a heater 126, a ring resonator 127, optical couplers 128 and 129, optical detectors 130 and 131, and terminals 132 and 133.

The optical waveguides 121 to 124, the ring optical waveguide 125, the ring resonator 127, and the optical couplers 128 and 129 are silicon optical waveguides. The ring optical waveguide 125 is optically coupled to the optical waveguides 123 and 124, and collectively constitute the ring resonator 127. The heater 126 is a thin film heater that is formed on at least an upper part and a lower part of the ring optical waveguide 125. FIG. 2 is an example of a transparent top diagram of the wavelength locker 120, and the heater 126 is indicated as a region between two broken-line circles. The heater 126 may be formed in such a way as to cover the ring optical waveguide 125. The heater 126 receives external power supply, and controls a temperature of the ring optical waveguide 125. When the heater 126 is formed only in the vicinity of the ring optical waveguide 125, a resonance wavelength of the ring resonator 127 can be controlled with less power as compared to a case in which the entire wavelength locker 120 is heated by a large-sized heater. Power of the heater 126 I supplied from an external electric circuit of the wavelength locker 120. Note that, in FIG. 2, description of wiring relating to power supply to the heater 126 is omitted.

The light output from the wavelength control unit 110 is input to the optical coupler 128. The optical coupler 128 splits the input light. One part of the split light is output to a photo detector (PD) 130, and the other part of the split light is output to the optical coupler 129. The optical detector 130 is, for example, a photodiode, and outputs a photo current proportional to intensity of the light input to the optical coupler 128. The output current of the optical detector 130 is output from the terminal 132 to an external electric circuit via electric wiring on the silicon optical waveguide.

One part of the light output from the optical coupler 128 is input to the optical coupler 129. The optical coupler 129 splits the input light. One part of the light split by the optical coupler 129 is output to the outside of the wavelength locker 120 via the optical waveguide 121. The other part of the light split by the optical coupler 129 is output to the ring resonator 127. The optical detector 131 is coupled to one end of the optical waveguide 124 included in the ring resonator 127. The optical detector 131 is, for example, a photodiode. The output current of the optical detector 131 is output from the terminal 133 to an external electric circuit via electric wiring on the silicon optical waveguide.

Figure 3:
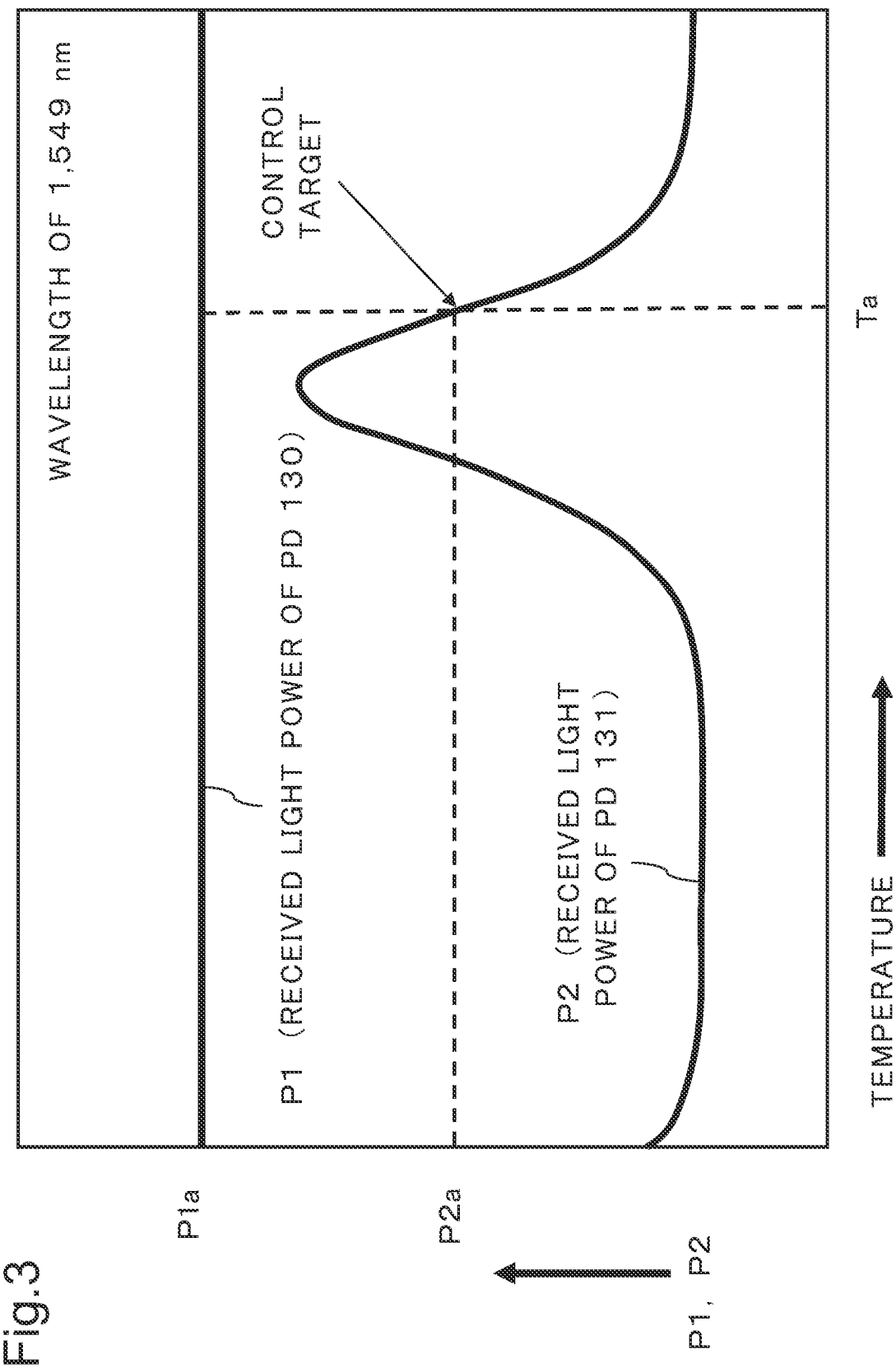
FIG. 3 illustrates a property example of the wavelength locker.

FIG. 3 illustrates a property example of the wavelength locker 120. The horizontal axis in FIG. 3 indicates power applied to the heater 126, and the vertical axis indicate received light power P1 of the optical detector 130 and received light power P2 of the optical detector 131. As power applied to the heater 126 is increased, a temperature of the heater 126 rises, and a property of P2 changes. Further, a peak position of P2 differs for each wavelength.

For example, for a plurality of different wavelengths, property data pieces relating to the wavelength locker 120 are prepared in accordance with the wavelengths. Further, a property data piece relating to a wavelength required for the light source (target wavelength) is selected from the property data pieces for the plurality of wavelengths. Moreover, from the selected property data, control targets for P1 and P2, and a temperature of the heater 126 at that time are determined. FIG. 3 illustrates an example of a control target being P1=P1$a$, P2=P2$a$, and T=Ta. Further, a wavelength of the light source is controlled through use of the wavelength control unit 110 in such a way that P1 and P2 are P1$a$ and P2$a$ being the target values while maintaining a temperature T of the heater 126 to Ta. The external electric circuit of the wavelength locker 120 executes control of the wavelength control unit 110 and temperature control of the heater 126, based on P1 and P2. Further, P2 may be normalized with P1, and a value of P2/P1 may be used as the target value. In this manner, the electric circuit controls the wavelength control unit 110 in such a way that P1 and P2 are specific values indicating a relation between the wavelength of the output light and the target wavelength. Note that there has been known a configuration in which a wavelength of a tunable laser is monitored through use of a wavelength locker. For example, PTL 1 describes a general procedure for monitoring a wavelength of a light source.

A general wavelength locker requires preparation of individual components such as an etalon and a beam splitter, and further requires optical coupling between those optical components. Thus, as compared to the wavelength locker 120 described with reference to FIG. 2, the general wavelength locker requires a large number of optical components and time for optical axis adjustment between those optical components, which causes a problem of difficulties in reducing a price and a size. Moreover, in the general wavelength locker, an entire substrate on which a wavelength locker including a plurality of optical elements is mounted is mounted on a large-sized heater, and thus temperature adjustment is performed. Thus, the general wavelength locker has a problem of large power consumption.

However, the wavelength locker 120 illustrated in FIG. 2 does not require an etalon or a beam splitter being an individual component in the general wavelength locker.

Further, the silicon optical waveguides having functions of those components integrally constitute the wavelength locker 120. Thus, the wavelength locker 120 can be reduced in size and price. Further, the wavelength locker 120 can achieve low power consumption of the wavelength locker 120 due to the heater 126 provided in the vicinity of the ring optical waveguide 125.

Second Example Embodiment

Figure 4:
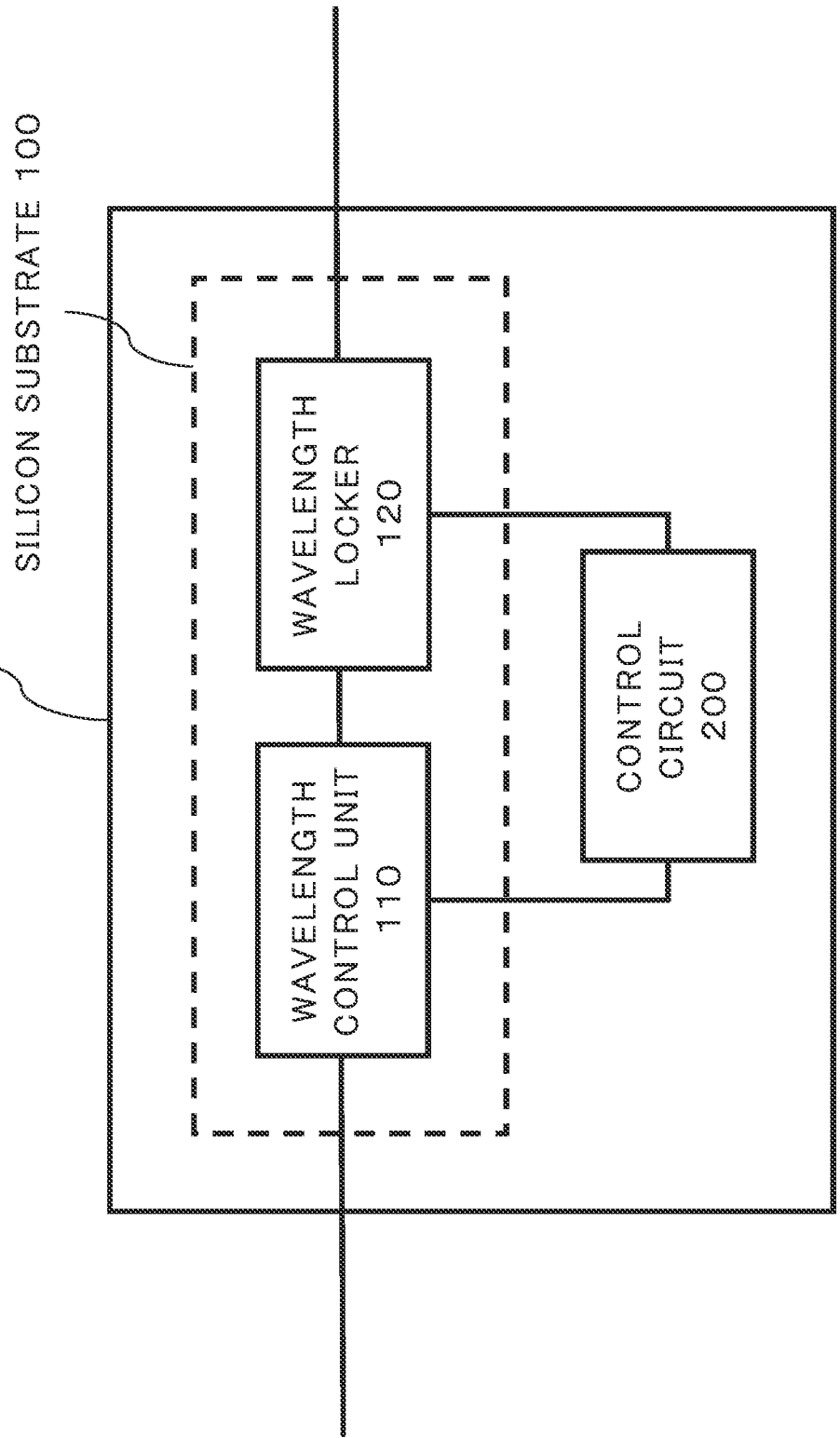
FIG. 4 illustrates a configuration example of an optical waveguide module according to a second example embodiment.

FIG. 4 is a block diagram illustrating a configuration example of an optical waveguide module 11 according to a second example embodiment. The optical waveguide module 11 is different from the optical waveguide module 10 in FIG. 1 in that a control circuit 200 is included. The control circuit 200 is an electric circuit coupled to the wavelength locker 120 and the wavelength control unit 110 described in the first example embodiment. In other words, the control circuit 200 is coupled to the heater 126, and the terminals 132 and 133 via electric wiring. Further, the control circuit 200 is also coupled to the wavelength control unit 110 via electric wiring.

The control circuit 200 controls a wavelength of the light source for the light input to the wavelength control unit 110, through use of the photo current output from the wavelength locker 120 (in other words, the received light power of the optical detector 130 and 131). In other words, the control circuit 200 controls the wavelength control unit 110 in such a way that an amplitude of an electric signal output from the wavelength locker 120 is a target value. In FIG. 4, the control circuit 200 is arranged outside of the silicon substrate 100. However, the control circuit 200 may be arranged on the silicon substrate 100.

With the optical waveguide module 11 thus configured, the wavelength control unit 110, the wavelength locker 120, and the function module including a control function for those components can be provided as an integrated module.

Third Example Embodiment

Figure 5:
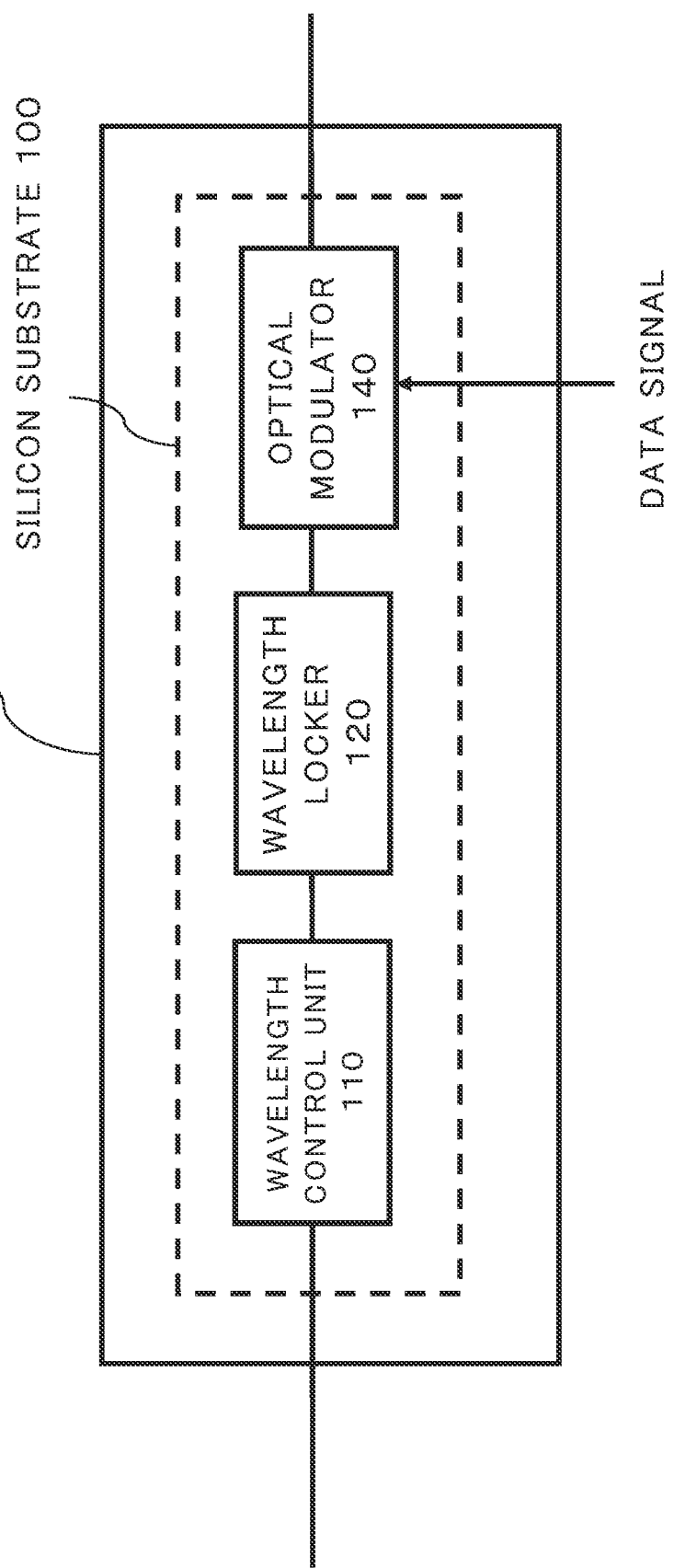
FIG. 5 illustrates a configuration example of an optical waveguide module according to a third example embodiment.

FIG. 5 is a block diagram illustrating a configuration example of an optical waveguide module 12 according to a third example embodiment. The optical waveguide module 12 is different from the optical waveguide module 10 in FIG. 1 in that an optical modulator 140 is included. In the optical waveguide module 12, in addition to the wavelength control unit 110 and the wavelength locker 120, the optical modulator 140 is formed as a silicon optical waveguide on the same silicon substrate 100. Further, an optical transmission path between the wavelength locker 120 and the optical modulator 140 may also be formed as a silicon optical waveguide integrated with the wavelength locker 120 and the optical modulator 140.

The optical modulator 140 modulates the light output from the wavelength locker 120 with a data signal, and outputs the modulated light to the outside of the optical waveguide module 12. The data signal is, for example, user data transmitted in the optical transmission system in which the optical waveguide module 12 is used, or data for managing the optical transmission system.

The optical waveguide module 12 thus configured enables realization of the optical transmitter that is reduced in size and price. The reason therefor is that, since the wavelength control unit 110, the wavelength locker 120, and the optical modulator 140 are formed on the same silicon substrate, manufacturing is facilitated and optical axis adjustment therebetween is not required as compared to a configuration in which those elements are implemented as individual optical elements.

Fourth Example Embodiment

Figure 6:
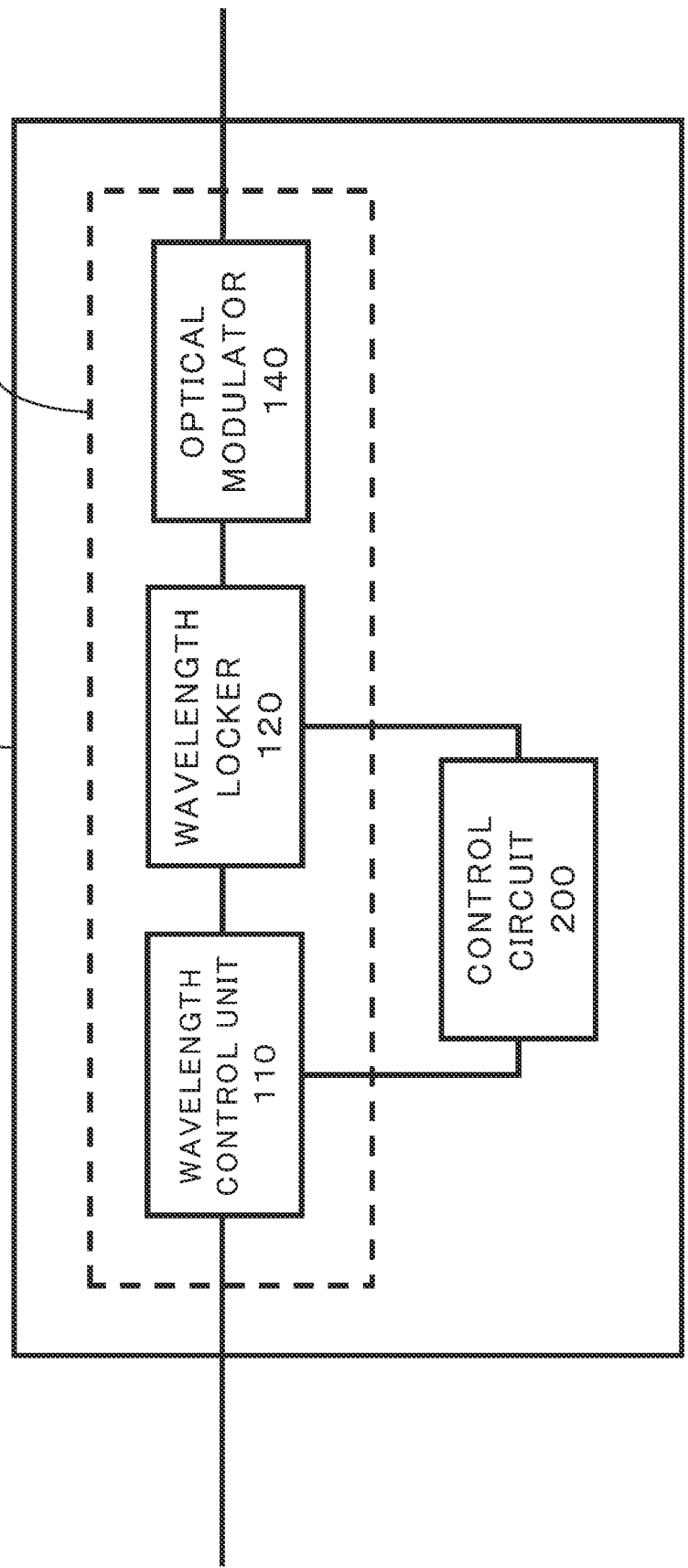
FIG. 6 illustrates a configuration example of an optical waveguide module according to a fourth example embodiment.

FIG. 6 is a block diagram illustrating a configuration example of an optical waveguide module 13 according to a fourth example embodiment. The optical waveguide module 13 is achieved by adding the control circuit 200 that is included in the optical waveguide module 11 in FIG. 4 to the optical waveguide module 12 in FIG. 5 that includes the optical modulator 140. The optical waveguide module 13 having such a configuration exerts the effects of both the optical waveguide modules 11 and 12.

Fifth Example Embodiment

Figure 7:
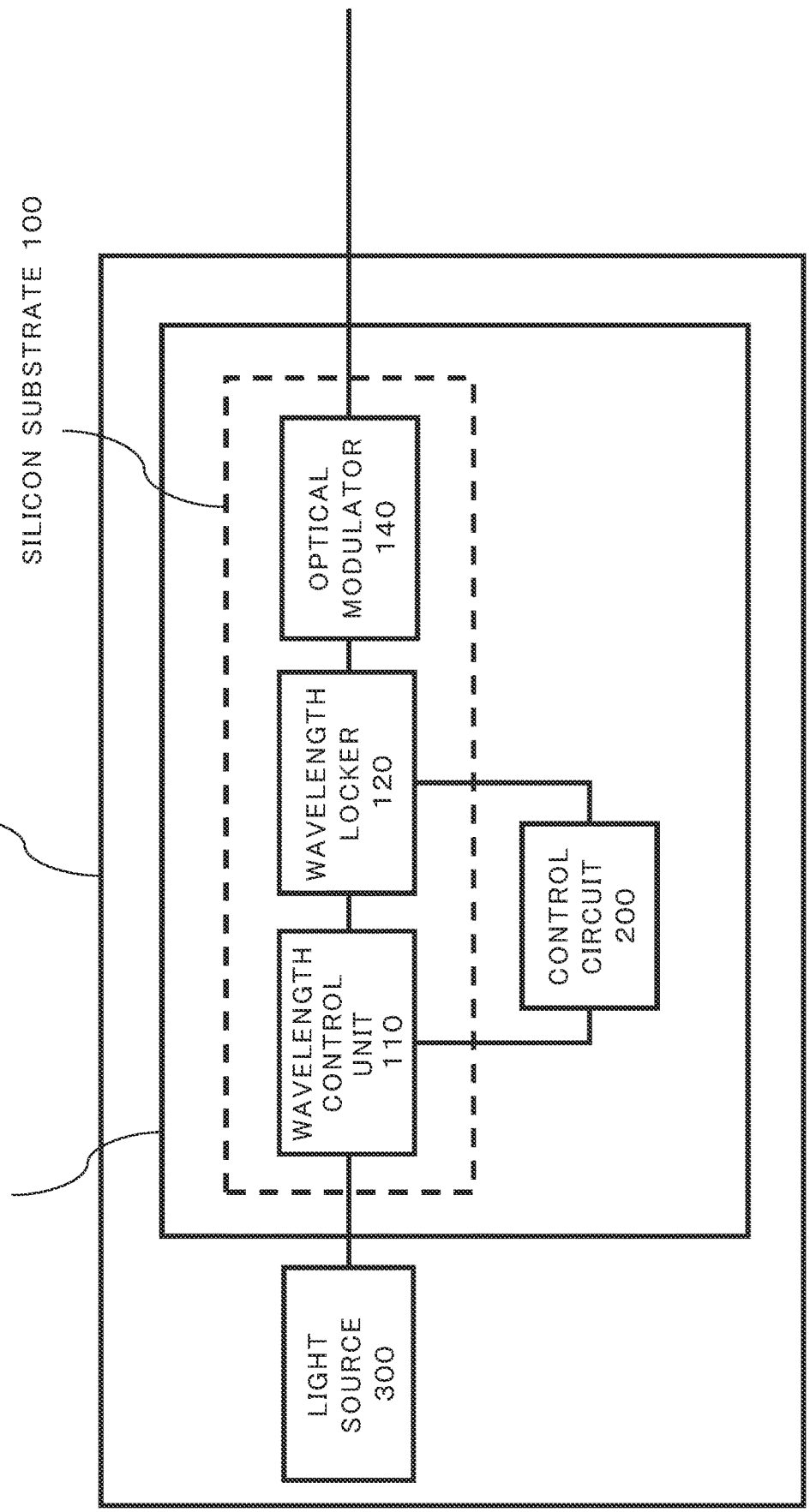
FIG. 7 illustrates a configuration example of an optical transmission module according to a fifth example embodiment.

FIG. 7 is a block diagram illustrating a configuration example of an optical transmission module 20 according to a fifth example embodiment. The optical transmission module 20 includes the optical waveguide module 13 described with reference to FIG. 6 and a light source 300. In the first example embodiment to the fourth example embodiment, the light source 300 is a light source that generates light input to the wavelength control unit 110, and a wavelength of the light source 300 is controlled by the wavelength control unit 110. In other words, the light source 300 and the wavelength control unit 110 constitute one tunable light source. Further, the control circuit 200 controls the wavelength control unit 110 in such a way that each of the photo currents of the optical detectors 130 and 131 included in the wavelength locker 120 is a predetermined value (in other words, the wavelength of the light source 300 is the target wavelength). The light source 300 may be formed on the silicon substrate 100 together with the wavelength control unit 110, the wavelength locker 120, and the optical modulator 140.

The optical transmission module 20 thus configured is applicable to an optical transmitter of an optical transceiver. Further, the optical transmission module 20 includes the optical waveguide module 13, and hence the optical transmitter and the optical transceiver that are reduced in size and price can be achieved.

Sixth Example Embodiment

Figure 8:
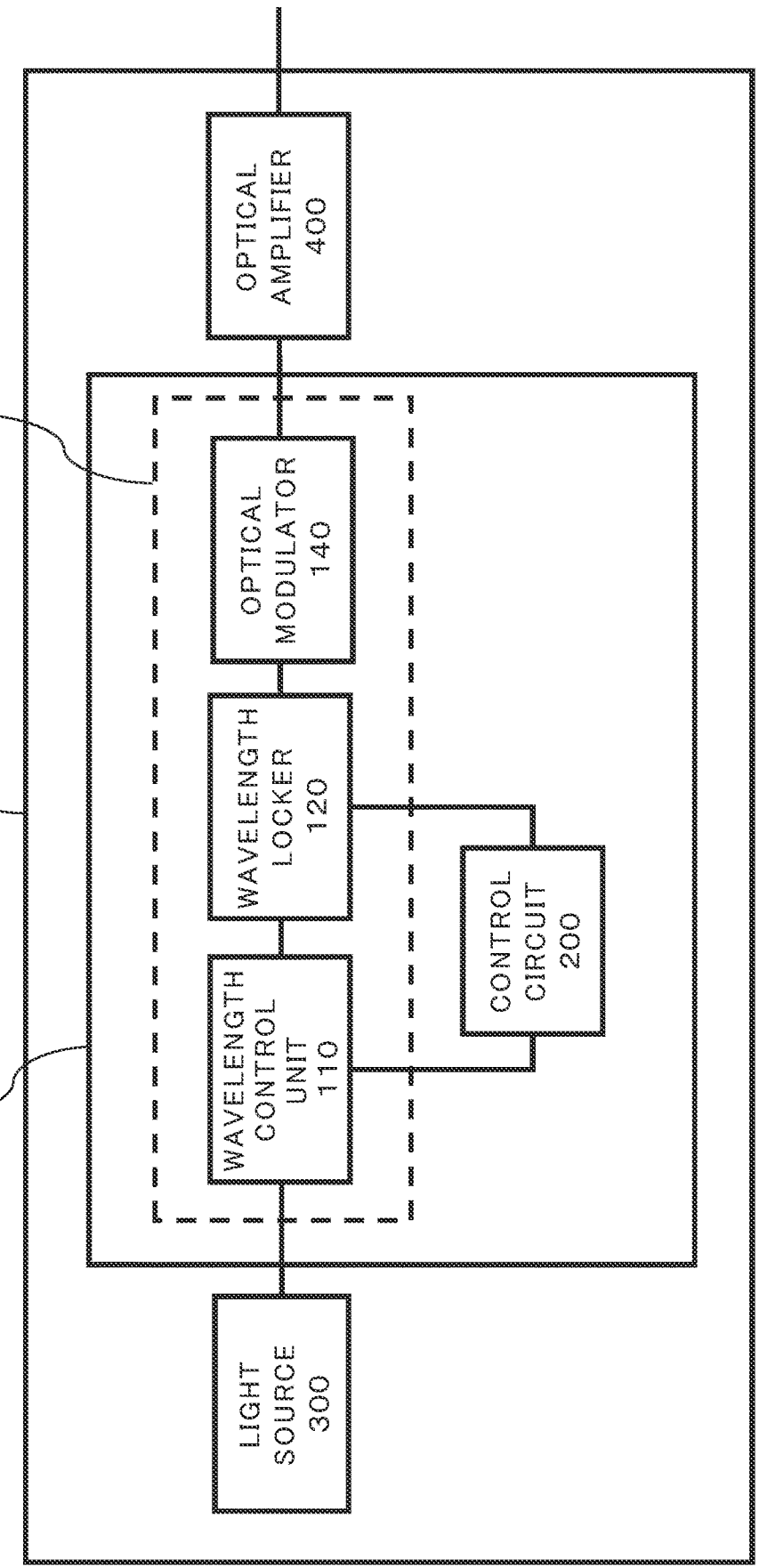
FIG. 8 illustrates a configuration example of an optical transmission module according to a sixth example embodiment.

FIG. 8 is a block diagram illustrating a configuration example of an optical transmission module 21 according to a sixth example embodiment. The optical transmission module 21 includes the optical transmission module 20 described in FIG. 7 and an optical amplifier 400. The optical amplifier 400 is, for example, a silicon optical amplifier. The optical amplifier amplifies light output from the optical modulator 140. The optical amplifier 400 may be formed on the silicon substrate 100 together with the wavelength control unit 110, the wavelength locker 120, and the optical modulator 140. The optical amplifier 400 is also referred to as a booster amplifier.

The optical transmission module 21 thus configured is applicable to an optical transmitter of an optical transceiver. Further, with the optical transmission module 21, the optical transmitter and the optical transceiver that are reduced in size and price can be achieved, and the propagation distance of the light modulated by the optical modulator 140 can be elongated.

Note that the example embodiments of the present invention may be described as in Supplementary Notes given below, but are not limited thereto.

(Supplementary Note 1)

An optical waveguide module including:
a wavelength controller that controls a wavelength of output light output from a light source; and
a wavelength locker that receives an input of the output light and outputs an electric signal indicating a relation between a wavelength of the output light and a target wavelength, wherein
the wavelength controller and the wavelength locker are formed as a semiconductor optical waveguide on a same semiconductor substrate.

(Supplementary Note 2)

The optical waveguide module according to Supplementary Note 1, wherein
the wavelength locker includes a ring optical waveguide, and a property of the wavelength locker is set by a heater that controls a temperature of the ring optical waveguide.

(Supplementary Note 3)

The optical waveguide module according to Supplementary Note 2, wherein
the heater is a thin film heater formed on at least one of an upper part and a lower part of the ring optical waveguide.

(Supplementary Note 4)

The optical waveguide module according to any one of Supplementary Notes 1 to 3, further including
a control circuit that controls the wavelength controller in such a way that an amplitude of the electric signal is a specified value indicating a relation between a wavelength of the output light and the target wavelength.

(Supplementary Note 5)

The optical waveguide module according to any one of Supplementary Notes 1 to 4, wherein
the semiconductor substrate is a silicon substrate, and a semiconductor optical waveguide is a silicon optical waveguide.

(Supplementary Note 6)

The optical waveguide module according to any one of Supplementary Notes 1 to 5, further including
an optical modulator that is formed on the semiconductor substrate and modulates the output light.

(Supplementary Note 7)

An optical transmission module including:
the light source; and
the optical waveguide module according to Supplementary Note 6.

(Supplementary Note 8)

The optical transmission module according to Supplementary Note 7, further including
an optical amplifier that amplifies light output from the optical modulator.

(Supplementary Note 9)

A manufacturing method of an optical waveguide module, including:
forming, on a semiconductor substrate, a wavelength controller that controls a wavelength of output light output from a light source; and
forming, on the semiconductor substrate, a wavelength locker that outputs an electric signal indicating a relation between a wavelength of the output light and a target wavelength.

(Supplementary Note 10)

The manufacturing method of an optical waveguide module according to Supplementary Note 9, further including
forming a heater that controls a temperature of a ring optical waveguide included in the wavelength locker.

(Supplementary Note 11)

The manufacturing method of an optical waveguide module according to Supplementary Note 10, wherein
a thin film heater is formed as the heater on at least one of an upper part and a lower part of the ring optical waveguide.

An example advantage according to the invention provides a technique for achieving the optical transmitter that is reduced in size and price.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

For example, in the example embodiments described above, description is made on the case in which the wavelength control unit 110, the wavelength locker 120, and the like are formed on the silicon substrate 100 as an example. However, the materials of the substrate and the optical waveguide are not limited to silicon. As those materials, the semiconductor substrate and the semiconductor waveguide that are formed of freely selected materials applicable to the optical transmitter may be used.

Further, the configurations described in the example embodiments are not necessarily mutually exclusive. The actions and the effects of the present invention may be achieved in a configuration by combining an entirety or part of the example embodiments described above.

Part or an entirety of the functions and the procedures described in each of the example embodiments given above may be achieved when a central processing unit (CPU) included in the control circuit 200 executes a program. The program is recorded in a CPU-readable format in a recording medium that is fixed and non-transitory. A semiconductor memory or a hard disk drive device is used, but the recording medium is not limited thereto.

REFERENCE SIGNS LIST

10 to 13 Optical waveguide module
20 and 21 Optical transmission module
100 Silicon substrate
110 Wavelength control unit
120 Wavelength locker
121 to 124 Optical waveguide
125 Ring optical waveguide
126 Heater
127 Ring resonator
128 and 129 Optical coupler
130 and 131 Optical detector
132 and 133 Terminal
140 Optical modulator
200 Control circuit
300 Light source
400 Optical amplifier

The invention claimed is:

1. An optical waveguide module comprising:
a wavelength controller configured to control a wavelength of output light output from a light source; and
a wavelength locker configured to receive the light and output an electric signal indicating a relation between a wavelength of the output light and a target wavelength, the wavelength locker comprising:
an optical coupler that splits the output light from the wavelength controller into a first light, a second light and a third light;
a first optical detector;
a second optical detector; and
a ring optical waveguide,
wherein
the wavelength controller and the wavelength locker are formed as a semiconductor optical waveguide on a same semiconductor substrate,
the first light is output outside the wavelength locker,
the second light is input to the first optical detector,
the third light is input to the second optical detector via the ring optical waveguide, and
the electric signal includes an electric signal output from the first optical detector and an electrical signal output from the second optical detector.

2. The optical waveguide module according to claim 1, wherein
a property of the wavelength locker is set by a heater that controls a temperature of the ring optical waveguide.

3. The optical waveguide module according to claim 2, wherein
the heater is a thin film heater formed on at least one of an upper part and a lower part of the ring optical waveguide.

4. The optical waveguide module according to claim 3, further comprising
a control circuit configured to control the wavelength controller in such a way that an amplitude of the electric signal is a specified value indicating a relation between the wavelength of the output light and the target wavelength.

5. The optical waveguide module according to claim 3, wherein
the semiconductor substrate is a silicon substrate, and the semiconductor optical waveguide is a silicon optical waveguide.

6. The optical waveguide module according to claim 3, further comprising
an optical modulator formed on the semiconductor substrate and configured to modulate the output light.

7. The optical waveguide module according to claim 2, further comprising
a control circuit configured to control the wavelength controller in such a way that an amplitude of the electric signal is a specified value indicating a relation between the wavelength of the output light and the target wavelength.

8. The optical waveguide module according to claim 2, wherein
the semiconductor substrate is a silicon substrate, and the semiconductor optical waveguide is a silicon optical waveguide.

9. The optical waveguide module according to claim 2, further comprising
an optical modulator formed on the semiconductor substrate and configured to modulate the output light.

10. The optical waveguide module according to claim 1, further comprising
a control circuit configured to control the wavelength controller in such a way that an amplitude of the electric signal is a specified value indicating a relation between the wavelength of the output light and the target wavelength.

11. The optical waveguide module according to claim 1, wherein
the semiconductor substrate is a silicon substrate, and the semiconductor optical waveguide is a silicon optical waveguide.

12. The optical waveguide module according to claim 1, further comprising
an optical modulator formed on the semiconductor substrate and configured to modulate the output light.

13. An optical transmission module comprising:
the light source; and
the optical waveguide module according to claim 12.

14. The optical transmission module according to claim 13, further comprising
an optical amplifier configured to amplify light output from the optical modulator.

15. A manufacturing method of an optical waveguide module, comprising:
forming, on a semiconductor substrate, a wavelength controller configured to control a wavelength of output light output from a light source; and
forming, on the semiconductor substrate, a wavelength locker configured to output an electric signal indicating a relation between a wavelength of the output light and a target wavelength, wherein
the wavelength locker comprises:
an optical coupler that splits the output light from the wavelength controller into a first light, a second light and a third light;
a first optical detector;
a second optical detector; and
a ring optical waveguide,
the first light is output outside the wavelength locker,
the second light is input to the first optical detector,
the third light is input to the second optical detector via the ring optical waveguide, and
the electric signal includes an electric signal output from the first optical detector and an electrical signal output from the second optical detector.

16. The manufacturing method of an optical waveguide module according to claim 15, further comprising
forming a heater configured to control a temperature of the ring optical waveguide.

* * * * *